March 24, 1953  P. L. CIACCIO  2,632,335
WINCH TENSION RETAINING BELT-CLUTCH
Filed Oct. 20, 1950
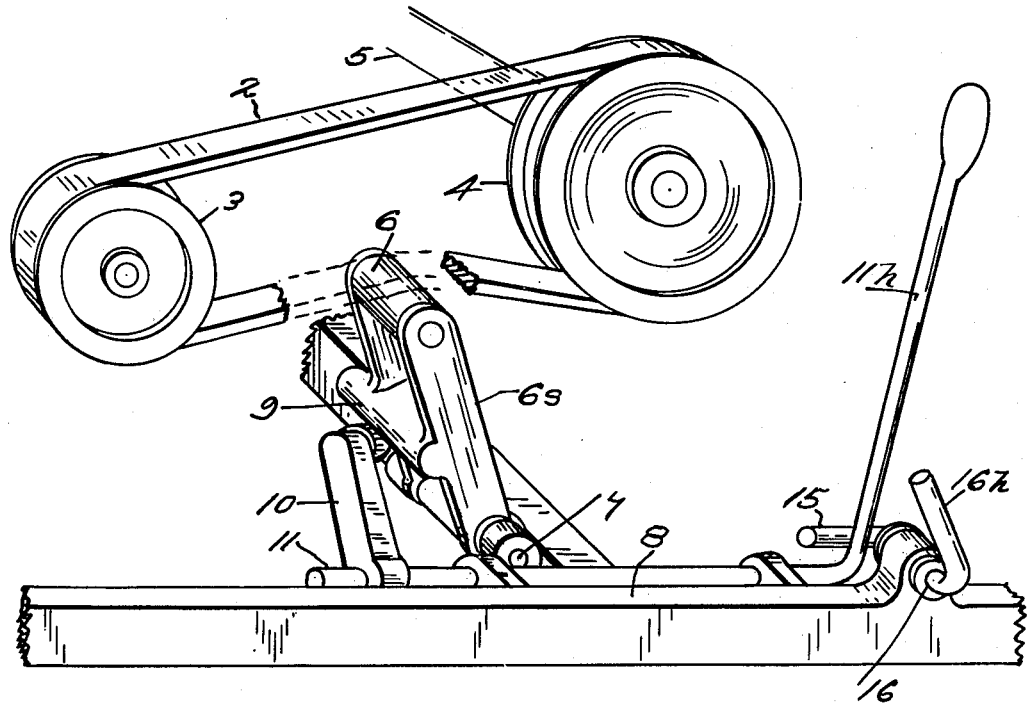
INVENTOR,
Peter L. Ciaccio;
By
Frederick E. Maynard Patented Mar. 24, 1953

2,632,335

UNITED STATES PATENT OFFICE 2,632,335

WINCH TENSION RETAINING BELT-CLUTCH

Peter L. Ciaccio, Los Angeles, Calif.

Application October 20, 1950, Serial No. 191,182

4 Claims. (Cl. 74—242.1)

This invention is a tension controller for belt transmissions and has to do with improvements in the form of belt-clutch disclosed in Ciaccio Patent No. 2,505,277.

The instant invention eliminates the toggle linkage of the said patent and, instead, has for a purpose to provide a tensioner having a clutch function, incorporating a simple and practical means to pre-set and hold a desired tension in a driving belt, and provide for a supplemental tension increment, at will, to meet a heavier load than the pre-set tension can handle. And a purpose is to provide a locking means to hold the initial tension and being capable of instant throw-off without manual operation of the pre-setting means as is necessary in the machine of said patent.

In the present invention the pre-setting means is manually operable independently and prior to functioning of the locking means which is, itself, manually set to engage a part of the pre-setting means this latter being automatically incapacitated by belt re-action when released by the lock.

The invention resides in certain advancements in this art as set forth in the ensuing disclosure and has, with the above, additional objects and advantages as hereinafter developed, and whose constructions, combinations and details of means and the manner of operation will be made manifest in the following description of the herewith illustrative embodiment; it being understood that modifications, variations, adaptations and equivalents may be resorted to within the scope, spirit and principles of the invention as is claimed in conclusion hereof.

The drawing is a perspective view of the tensioner, in belt combination.

A conventional belt 2 is here engaged by a drive wheel 3 and passes to an opposite end driven wheel 4 from which power is delivered to a winch shaft 5. Unless the belt is tensioned the wheel 4 remains idle.

In this invention a stretch portion of the belt is engageable by a clutch or pressure part, which may be a roller 6 mounted on the outer or swinging end of a strut 6s having a pivot 7 mounted on a part of the winch frame 8. The strut has a rigid cross-rail 9 normally supported under belt re-action on the outer end of a jack crank 10 fixed on a rocker shaft 11 journaled on the frame 8 with its axis at a right angle to the axis of the swinging strut so that when the shaft 11 is rocked by its hand lever 11h the jack crank forces the strut roller or shoe 6 upward to increase the tension of the belt to a desired drive effort on the driven wheel 4.

As the lever 11h swings to a location on its pivot at which the pre-tension degree is set in the belt the attending operator instantly sweeps a locking dog 15 into engagement with the lever to prevent belt tension from pulling it back to idle position. The dog is an arm radial to and rigidly fixed on a cross-spindle 16 having a short handle 16h. The locked jack crank therefore sustains the tensioned belt at a pre-set and normal tension for normal load operations of the winch.

But if and when a greater load arises on the driven wheel the operator pulls the lever 11h harder and swings it freely away from the positioned dog (at position shown) with the result of an increment of power tension on the belt for greater effort on the driven wheel.

A feature of the invention is that, in an emergency, the operator can instantly sweep the dog from its locking position (shown) without need of manual operation of the tensioning lever 11h. The tension of the belt automatically represses the released strut and its boosting jack crank.

What is claimed is:

1. A device, for tensioning a transmission belt, including; in combination, a supporting frame, a belt generally parallel to the frame, a tension strut pivoted at one end on the frame and normally at its opposite end engaging a stretch of the belt, said strut having a rigid rail parallel to the axis of the strut pivot, a rock shaft pivoted on the frame on an axis at a right angle to the axis of the strut and having an arm unattached to and slidably engaging said rail whereby to jack the strut, said rock shaft having a handle extending at an angle thereto, and a manual locking device pivotally mounted on said frame and independently of the handle of said shaft and being engageable with said handle to lock said shaft to hold the belt at initial tension.

2. The device of claim 1; said locking device including a spindle journaled on the frame and having a manual arm and a radial dog swingable to and from locking engagement with the inner end portion of the handle; the handle being movable additionally in a tensioning direction from locking position of the dog.

3. The device of claim 2; the axis of the spindle being at a right angle to the axis of the shaft and the dog lying and moving in a plane parallel to the shaft.

4. The device of claim 1; said locking device including a manually operative spindle journaled on the frame on an axis parallel to the pivot axis of the strut and having a locking dog sweeping in an arc whose plane is parallel to the said shaft and at a right angle to the plane of the strut.

PETER L. CIACCIO.

REFERENCES CITED

The following references are of record in the file of this patent:

UNITED STATES PATENTS

| Number | Name | Date |
|---|---|---|
| 1,423,172 | Anderson | July 18, 1922 |
| 1,887,433 | Ruhren | Nov. 8, 1932 |
| 2,540,894 | Krause | Feb. 6, 1951 |